(12) United States Patent
Kempfle (10) Patent No.: US 10,487,560 B2
(45) Date of Patent: Nov. 26, 2019

(54) DOMESTIC APPLIANCE WITH A DOOR CONTROLLER AND METHOD OF OPERATING THE DOOR CONTROLLER

(71) Applicant: BSH HAUSGERAETE GMBH, Munich (DE)

(72) Inventor: Stephan Kempfle, Ellzee (DE)

(73) Assignee: BSH Hausgeraete GmbH, Munich (DE)

( * ) Notice: Subject to any disclaimer, the term of this patent is extended or adjusted under 35 U.S.C. 154(b) by 602 days.

(21) Appl. No.: 15/143,790

(22) Filed: May 2, 2016

(65) Prior Publication Data

US 2016/0333625 A1 Nov. 17, 2016

(30) Foreign Application Priority Data

May 12, 2015 (DE) .................... 10 2015 208 830

(51) Int. Cl.
| | |
|---|---|
| G08B 13/08 | (2006.01) |
| E05F 15/60 | (2015.01) |
| F25D 23/02 | (2006.01) |
| E05B 47/00 | (2006.01) |
| G05B 15/02 | (2006.01) |

(52) U.S. Cl.
CPC .......... *E05F 15/60* (2015.01); *E05B 47/0046* (2013.01); *F25D 23/028* (2013.01); *G05B 15/02* (2013.01); *E05B 2047/0069* (2013.01); *E05Y 2900/30* (2013.01); *F25D 2700/04* (2013.01)

(58) Field of Classification Search
CPC .................. E05F 15/60; E05B 47/0046; E05B 2047/0069; F25D 23/028; F25D 2700/04; G05B 15/02; E05Y 2900/30

USPC ....................................................... 340/545.1
See application file for complete search history.

(56) References Cited

U.S. PATENT DOCUMENTS

| | | | | | |
|---|---|---|---|---|---|
| 9,062,911 | B2* | 6/2015 | Keller | ................... | F25D 17/047 |
| 2003/0019236 | A1* | 1/2003 | Heims | .................. | B67D 3/0009 |
| | | | | | 62/338 |
| 2004/0245272 | A1* | 12/2004 | Fitzgerald | ............... | G07F 9/026 |
| | | | | | 221/90 |
| 2005/0061158 | A1* | 3/2005 | Della Pietra | ........ | A47J 31/3633 |
| | | | | | 99/279 |
| 2005/0072178 | A1* | 4/2005 | Park | ...................... | F25D 23/126 |
| | | | | | 62/389 |
| 2006/0149323 | A1* | 7/2006 | Merry | ...................... | A61N 1/39 |
| | | | | | 607/5 |

(Continued)

FOREIGN PATENT DOCUMENTS

| | | |
|---|---|---|
| DE | 102006061083 A1 | 6/2008 |
| DE | 102013211722 A1 | 12/2014 |
| JP | 2014047930 A | 3/2014 |

*Primary Examiner* — Kerri L McNally
*Assistant Examiner* — Thang D Tran
(74) *Attorney, Agent, or Firm* — Laurence A. Greenberg; Werner H. Stemer; Ralph E. Locher (57) ABSTRACT

A domestic appliance has an appliance body, a door supported in a rotatable manner on the appliance body, a door actuator for driving the door, an activatable appliance function component and an actuator controller for activating the door actuator. The actuator controller is configured to monitor an activity status of the appliance function component and the actuator controller is configured only to activate the door actuator when the activatable appliance function component is inactive in response to receipt of an activation signal to activate the door actuator.

17 Claims, 4 Drawing Sheets

(56) References Cited

U.S. PATENT DOCUMENTS

| | | | | |
|---|---|---|---|---|
| 2006/0260346 | A1* | 11/2006 | Coulter | F25C 5/24 62/340 |
| 2008/0156011 | A1* | 7/2008 | Culley | F25C 5/22 62/228.1 |
| 2008/0184730 | A1* | 8/2008 | Voglewede | F25D 23/126 62/389 |
| 2009/0033189 | A1* | 2/2009 | Glanz | E05F 1/105 312/405 |
| 2009/0248207 | A1* | 10/2009 | Yoo | F25D 25/025 700/275 |
| 2011/0023511 | A1* | 2/2011 | Lee | B67D 1/0857 62/178 |
| 2011/0112702 | A1* | 5/2011 | Huizenga | G05B 15/02 700/295 |
| 2011/0139772 | A1* | 6/2011 | Darney | E05B 47/0002 219/702 |
| 2011/0307098 | A1* | 12/2011 | Ennis | G10L 15/26 700/275 |
| 2012/0073321 | A1* | 3/2012 | Davis | F25D 23/028 62/449 |
| 2013/0067375 | A1* | 3/2013 | Kim | F25D 29/00 715/769 |
| 2013/0067940 | A1* | 3/2013 | Shim | F25B 49/005 62/125 |
| 2013/0091772 | A1* | 4/2013 | Berger | F25C 5/22 49/324 |
| 2013/0207530 | A1* | 8/2013 | Yeo | F25D 23/126 312/405 |
| 2014/0268648 | A1* | 9/2014 | Gomes | F25D 27/005 362/94 |
| 2014/0373561 | A1* | 12/2014 | Alt | F25D 23/02 62/125 |
| 2015/0035432 | A1* | 2/2015 | Kendall | F25D 27/005 315/76 |
| 2015/0100152 | A1* | 4/2015 | Barragan Trevino | G06Q 20/322 700/232 |
| 2015/0180880 | A1* | 6/2015 | Nakano | G08C 17/02 726/4 |
| 2015/0247666 | A1* | 9/2015 | Kim | F25D 23/04 312/404 |
| 2016/0123657 | A1* | 5/2016 | Kim | F25D 29/00 62/125 |
| 2016/0169578 | A1* | 6/2016 | Linney, II | E05B 65/0042 62/56 |
| 2016/0252291 | A1* | 9/2016 | Kikuchi | F25D 23/028 312/405 |

* cited by examiner

DOMESTIC APPLIANCE WITH A DOOR CONTROLLER AND METHOD OF OPERATING THE DOOR CONTROLLER

CROSS-REFERENCE TO RELATED APPLICATION

This application claims the priority, under 35 U.S.C. § 119, of German application DE 10 2015 208 830.8, filed May 12, 2015; the prior application is herewith incorporated by reference in its entirety.

BACKGROUND OF THE INVENTION

Field of the Invention

The present invention relates to a domestic appliance with a door controller.

Domestic appliances, such as refrigerators or freezers for example, frequently consist of an appliance body with an interior, which can be reached by way of a door. Electronic door opening aids can be used to assist the door. These generally consist of a door actuator with an actuator controller integrated in the domestic appliance. Such a door opening aid for a refrigeration appliance is known for example from DE 10 1096 061 083 A1.

SUMMARY OF THE INVENTION

It is the object of the present invention to specify a domestic appliance with a door controller, which avoids incorrect activation of the door actuator.

According to a first aspect the inventive object is achieved by a domestic appliance with an appliance body, a door supported in a rotatable manner on the appliance body, a door actuator for driving the door, an activatable appliance function component and an actuator controller for activating the door actuator. The actuator controller is configured to monitor an activity status of the appliance function component and the actuator controller is configured only to activate the door actuator when the activatable appliance function component is inactive in response to receipt of an activation signal to activate the door actuator. This has the technical advantage for example that it avoids unwanted activation of the door actuator when the appliance function component is in use.

The domestic appliance can be an appliance for domestic use or for businesses, for example in the field of catering or hotels. It can be a refrigeration appliance for storing food and/or beverages, for example a refrigerator, a freezer or a combined refrigerator/freezer. It can also be an appliance for preparing food, for example a cooker or an oven, a cleaning appliance for dishes or clothing, for example a dishwasher or a washing machine, or a drying appliance.

The door can be arranged on a side face of the appliance body, as in the case of an upright freezer, or on its upper face, as in the case of a chest freezer. The door can have a handle that projects from the door or is configured as a recessed handle. The door can also be without a handle, for example in the case of a domestic appliance that is part of a handle-free kitchen design or a built in kitchen. The door and/or the appliance body can have seals, so that the closed door makes contact with the appliance body in a sealing manner.

The door actuator can be an electric motor, for example an electric multiphase motor. The door actuator can drive the door in an opening and/or closing direction. The actuator controller can activate or deactivate the door actuator and transmit control commands, for example control commands to open or close the door. The actuator controller can also contain a processor and a memory. The actuator controller can be arranged in the appliance body or in the door.

In a further advantageous embodiment of the domestic appliance the appliance function component and the actuator controller can be linked to a communication line, in particular to a communication bus. This has the technical advantage for example that it allows communication between the appliance function component and the actuator controller.

The communication bus can be part of a communication line also used by other appliance components in the domestic appliance, for example the cooling system in a refrigeration appliance and/or a display screen present in the appliance.

In a further advantageous embodiment of the domestic appliance the appliance function component is an ice dispenser component, a water dispenser component or a door lock.

In a further advantageous embodiment of the domestic appliance an activity controller of the appliance function component, in particular a pushbutton or a touch-sensitive display screen, and/or the appliance function component are arranged on the door. This has the technical advantage for example that a user can operate the appliance function component efficiently.

In a further advantageous embodiment of the domestic appliance a sensor is provided to detect actuation of the door by a user, in particular the pushing of the door or the pulling of the door, and configured to transmit the activation signal to activate the door actuator to the actuator controller on detection of the actuation. This has the technical advantage for example that a desire to open the door can be identified quickly.

Activation of the door actuator when the door is pushed, in what is referred to as push mode, can be deployed in doors without a door handle. Activation of the door actuator when the door is pulled, in what is referred to as pull mode, can take place after a door handle has been pulled. A time can also be set for the door to be kept open after opening. The opening time for the door can be set for example to 1, 2, 3, 4, 5, 6, 7, 8, 9, or 10 seconds. At the end of this time the door actuator can close the door.

In a further advantageous embodiment of the domestic appliance the sensitivity of the sensor can be set. This has the technical advantage for example that accidental activation of the door actuator can be avoided.

The sensitivity of the sensor can be set in such a manner that a normal pressure on a pushbutton to operate the appliance component is not interpreted as actuation of the door by the sensor. Different sensitivity levels can also be set, for example high, medium or low sensitivity, to set the domestic appliance for different users and operating scenarios. Different sensitivity levels can also be established for push and pull modes.

In a further advantageous embodiment of the domestic appliance the domestic appliance has an appliance controller for controlling the appliance function component, the actuator controller and appliance controller are connected for the purpose of communication and the appliance controller is configured to transmit the activity status of the appliance function component to the actuator controller. This has the technical advantage for example that the actuator controller can be informed efficiently about the status of the appliance function component.

The appliance controller can be arranged on the appliance body or on the door. The appliance controller can also contain a processor and/or a memory, for example a flash memory. The link for the purpose of communication can be a communication line, in particular a communication bus. Parameters of the actuator controller can also be stored in the appliance controller.

In a further advantageous embodiment of the domestic appliance the actuator controller is configured to call up a number of current appliance parameters of the domestic appliance or the appliance function component from the appliance controller, in particular after the domestic appliance has been switched on electrically or after the door actuator has been reset, in an initialization sequence. This has the technical advantage for example that the actuator controller can switch independently to an appropriate activity status after the domestic appliance has been switched on or reset. In this initialization sequence the actuator controller can send a series of requests by way of the communication link to the appliance controller, whereupon the appliance controller responds to the actuator controller with a corresponding parameter for each request.

In a further advantageous embodiment the initialization sequence is made up of the following requests which are called up step by step: in a first step a request is made for the type of domestic appliance, to which the appliance controller responds with the serial number. In a second step a request is made for the status of the door lock, to which the appliance controller responds with the status "open" or "locked", it being possible for the request also to be made if the domestic appliance does not have a door lock. In a third step a request is made for the status of the actuator controller, to which the appliance controller responds with the status "activated" or "deactivated". In a fourth step a request is made for the operating mode of the actuator controller, to which the appliance controller responds with "push mode" or "pull mode". In a fifth step a request is made for the door opening time, to which the appliance controller responds for example with 1, 2, 3, 4, 5, 6, 7, 8, 9 or 10 seconds, the request for the door opening time being made in particular in push mode. In a sixth step a request is made for the sensitivity level of the sensor in push mode, to which the appliance controller responds for example with "high", "medium" or "low". In a seventh step a request is made for the sensitivity level of the sensor in pull mode, to which the appliance controller responds for example with "high", "medium" or "low". According to one embodiment the actuator controller only switches to an active status when it has a response to all requests. According to a further embodiment the appliance controller can also transmit at least one response parameter for the steps two, three, four, five, six and seven of the above initialization sequence to the actuator controller after a status change on the part of the actuator controller and/or the appliance controller and/or the appliance function component.

In a further advantageous embodiment of the domestic appliance the appliance function component is configured to transmit an activation notification to the actuator controller when the appliance function component is activated and the actuator controller is configured to prevent activation of the door actuator when the activation notification from the appliance function component is present and the activation signal to activate the door actuator is received. This has the technical advantage for example that the actuator controller can identify and prevent unwanted activation of the door actuator when the appliance function component is operated.

In a further advantageous embodiment of the domestic appliance the actuator controller is configured to output a warning signal, in particular an acoustic or optical warning signal, when the activation signal to activate the door actuator is received and the door is locked by a door lock. This has the technical advantage for example that a user wishing to open a locked door can be warned quickly.

In a further advantageous embodiment of the domestic appliance the actuator controller has an operating panel for parameterizing the door actuator. This has the technical advantage for example that the user can set the actuator controller efficiently for the operating scenario.

The operating panel can be a touch display. The parameters can be the operating mode of the actuator controller, for example push or pull mode, the door opening time, or the sensitivity level of the sensor.

In a further advantageous embodiment of the domestic appliance the door actuator can be deactivated manually by the operating panel. This has the technical advantage for example that purely manual operation of the door can take place without the door actuator.

In a further advantageous embodiment of the domestic appliance the appliance controller and the actuator controller form a common control element. This has the technical advantage for example of reducing the technical complexity of the control elements in the domestic appliance.

The common control element can contain for example a single processor and a single memory used to control the appliance and the actuator. The common control element can be arranged on the appliance body or on the door. The common control element can also have an operating panel for controlling and/or parameterizing the appliance controller and the actuator controller.

According to a second aspect the inventive object is achieved by a method for controlling a door actuator for driving a door of a domestic appliance, which has an appliance body, on which the door is supported in a rotatable manner, an actuator controller for controlling the door actuator and an activatable appliance function component, wherein an activity status of the appliance function component is monitored and wherein the door actuator is only activated when the activatable appliance function component is inactive. This has the technical advantage for example that efficient control of the door actuator can avoid unwanted activation of the same.

In a further advantageous embodiment of the domestic appliance the door actuator is activated when the door is actuated. This has the technical advantage for example that the opening and/or closing of the door can be brought about by the door actuator.

Other features which are considered as characteristic for the invention are set forth in the appended claims.

Although the invention is illustrated and described herein as embodied in a domestic appliance with a door controller, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
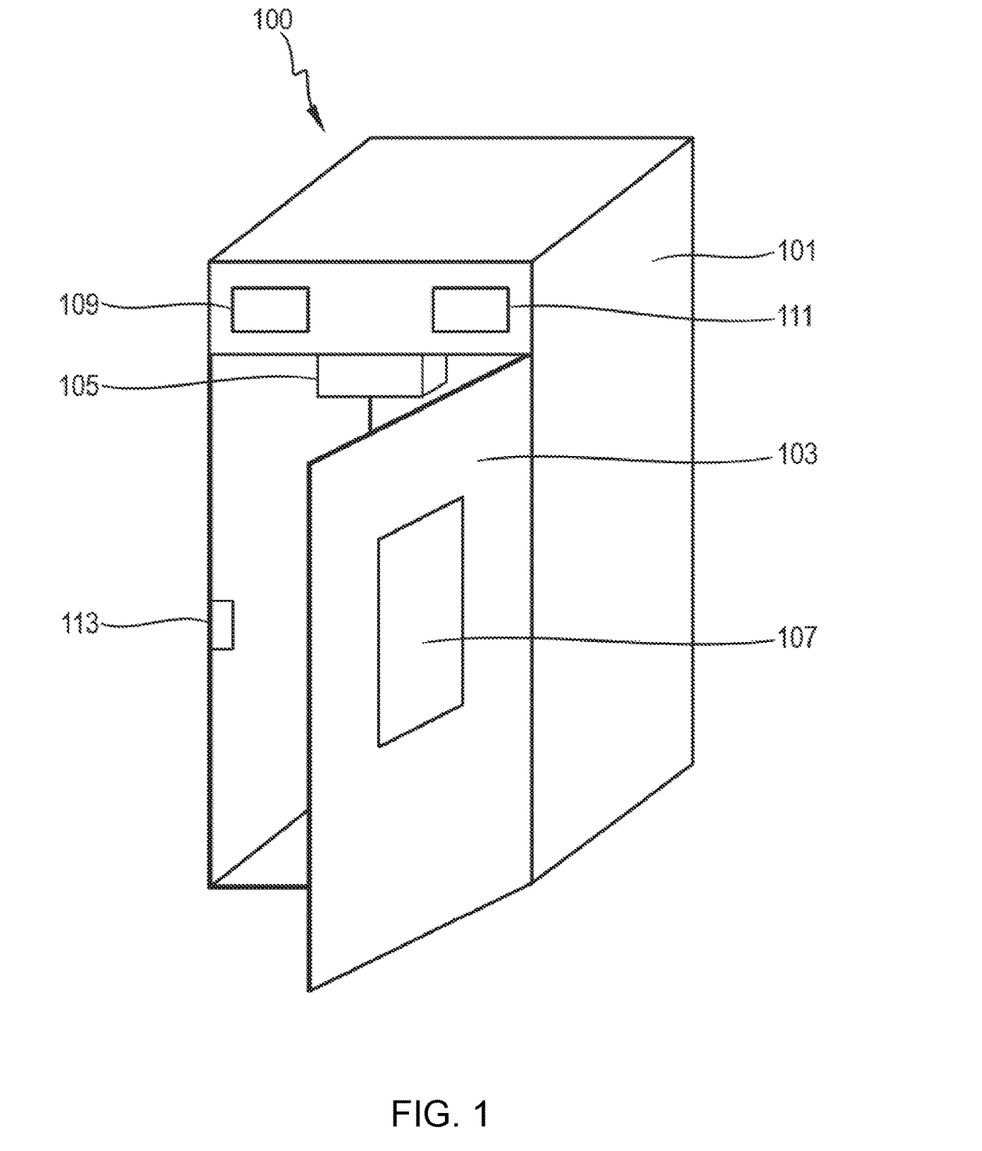
FIG. 1 is a diagrammatic, perspective view of a domestic appliance according to one embodiment of the invention.

Referring now to the figures of the drawings in detail and first, particularly to FIG. 1 thereof, there is shown a domestic appliance 100 can be configured with an appliance body 101, a door 103 supported in a rotatable manner on the appliance body 101, a door actuator 105 for driving the door 103, an activatable appliance function component 107 and an actuator controller 109 for activating the door actuator 105. The actuator controller 109 is configured to monitor an activity status of the appliance function component 107 and the actuator controller 109 is configured only to activate the door actuator 105 when the activatable appliance function component 107 is inactive in response to receipt of an activation signal to activate the door actuator 105.

FIG. 1 shows a schematic representation of the domestic appliance 100 according to one embodiment. The domestic appliance 100 consists of the appliance body 101 with the door 103 and the appliance function component 107 integrated in the door 103. The appliance body 101 also contains the door actuator 105 and the actuator controller 109, as well as an appliance controller 111.

The domestic appliance 100 can be an appliance for domestic use or for businesses, for example in the field of catering or hotels. It can be a refrigeration appliance for storing food and/or beverages, for example a refrigerator, a freezer or a combined refrigerator/freezer. It can also be an appliance for preparing food, for example a cooker or an oven, a cleaning appliance for dishes or clothing, for example a dishwasher or a washing machine, or a drying appliance.

The door 103 can be arranged on a side face of the appliance body 101, as in the case of an upright freezer, or on its upper face, as in the case of a chest freezer. The door 103 can have a handle that projects from the door 103 or is configured as a recessed handle. The door 103 can also be without a handle, for example in the case of a domestic appliance that is part of a handle-free kitchen design or a built in kitchen. The door 103 and/or the appliance body 101 can have seals, so that the closed door 103 makes contact with the appliance body 101 in a sealing manner.

The door actuator 105 can be an electric motor, for example an electric multiphase motor. The door actuator 105 can drive the door 103 in an opening and/or closing direction. The actuator controller 109 can activate or deactivate the door actuator 105 and transmit control commands, for example control commands to open or close the door 103. The actuator controller 109 can also contain a processor and a memory. The actuator controller 109 can be arranged in the appliance body 101 or in the door 103.

Figure 4:
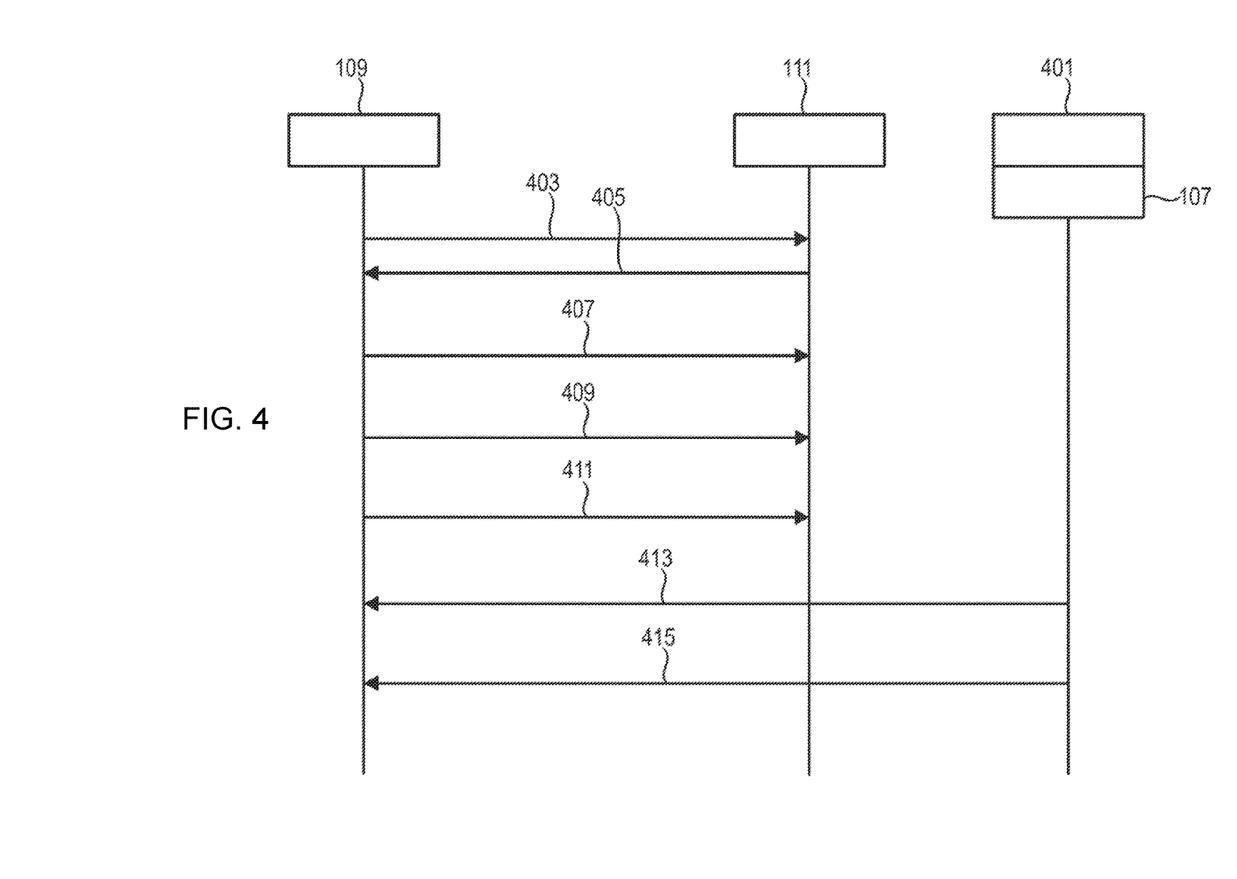
FIG. 4 is a schematic diagram of communication between components of a domestic appliance according to one embodiment.

According to a further embodiment an activity controller 401 for controlling the appliance function component 107 is arranged on the door 103 or on the appliance body 101 (see FIG. 4). The activity controller 401 can be a pushbutton or a touch-sensitive display screen, for example a touch display.

According to a further embodiment the appliance function component 107 is an ice or water dispenser component. This can be an ice or water dispenser that dispenses ice cubes or water after activation by the activity controller 401. According to a further embodiment the appliance function component 107 is a door lock. The door lock can be configured as a door safety device, for example in a child safety device, and can require a code to be input into an operating panel of the activity controller 401 for activation and/or deactivation.

According to a further embodiment the appliance function component 107 is arranged on the door 103, as shown in the schematic representation in FIG. 1. The appliance function component 107 can be arranged at any height on the door 103. According to a further embodiment the appliance function component 107 or a part of the appliance function component 107 can also be arranged in the appliance body 101, for example above the door 103 or on a side face of the domestic appliance 100 on which no door 103 is mounted.

According to a further embodiment the domestic appliance 100 contains a sensor 113 for detecting actuation of the door 103. The sensor 113 can be a pressure sensor. The sensor 113 can be arranged either on the door 103 or on the appliance body 101. In particular the sensor 113 can be arranged in the transition between door 103 and appliance body 101. The sensor 113 can register pulling at the door 103 and/or pushing on the door 103 and can activate the door actuator 105 in response. Different sensitivity levels can be set here for pulling, referred to as pull mode, and pushing, referred to as push mode. For example sensitivity can be increased for push mode, if the pushbutton of an activity controller 401 is mounted on the door 103, to avoid accidental opening of the door 103 when the pushbutton is actuated. According to a further embodiment the door is kept open for a defined period after activation of the door actuator 105 by the sensor 113, in particular after the door 103 has been opened in push mode. This opening time can be stored in the actuator controller 109. At the end of this time the actuator controller 109 can activate the door actuator 105 in the closing direction and thus close the door.

Figure 2:
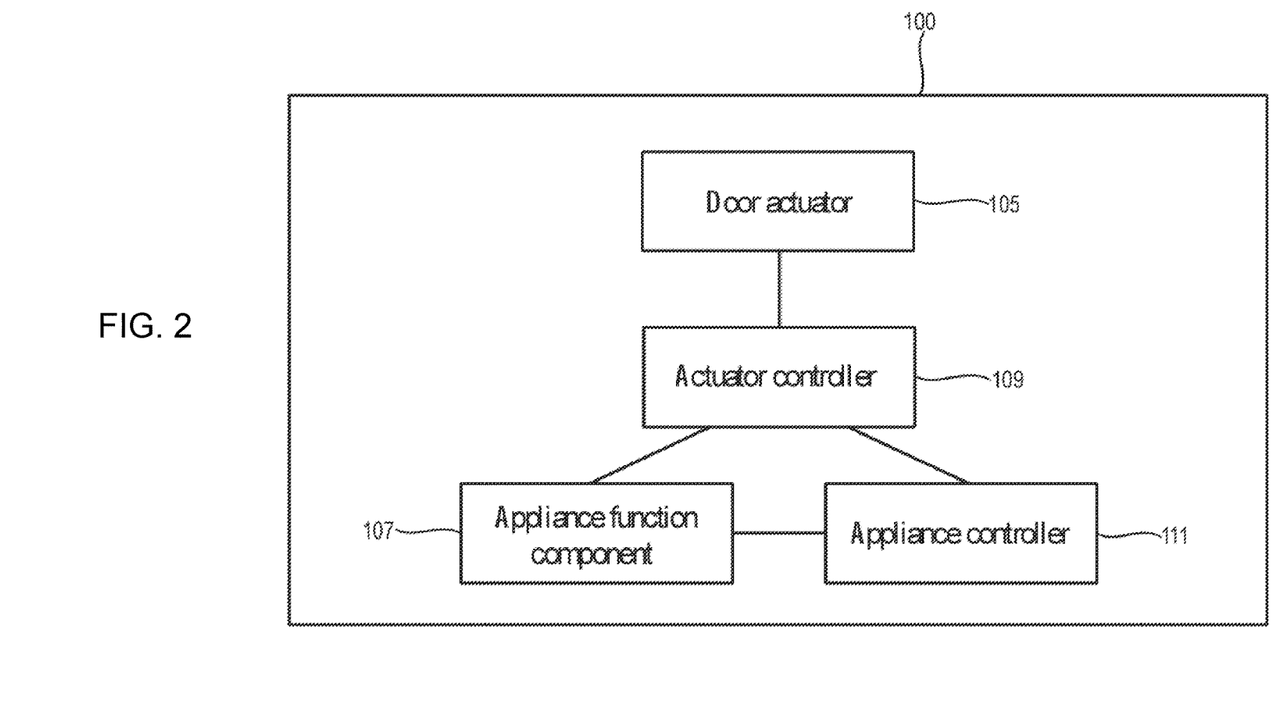
FIG. 2 is a schematic diagram of communication links in the domestic appliance according to one embodiment.

FIG. 2 shows a schematic diagram of the communication links in a domestic appliance 100 according to one embodiment. The communication link in FIG. 2 connects an actuator controller 109 to a door actuator 105, an appliance function component 107 and an appliance controller 111.

According to one embodiment the appliance function component 107 and the actuator controller 109 are linked to a communication line, in particular a communication bus. To this end a line arrangement containing a communication line can connect the appliance function component 107 to the actuator controller 109.

According to a further embodiment the domestic appliance 100 has an appliance controller 111 for controlling the appliance function component 107, which can be connected by way of a communication link to the actuator controller 109, as shown schematically in FIG. 2. The appliance controller 111 can be arranged on the appliance body 101 or on the door 103. The communication link can operate by way of a line arrangement. In particular the communication line can be part of the line arrangement, which can connect the appliance function component 107 to the actuator controller 109. In addition to the appliance function component 107 the appliance controller 111 can control further functions of the domestic appliance 100, for example temperature regulation in a refrigeration appliance. According to a further embodiment communication between the actuator controller 109 and the appliance function component 107 operates solely by way of the appliance controller 111.

Figure 3:
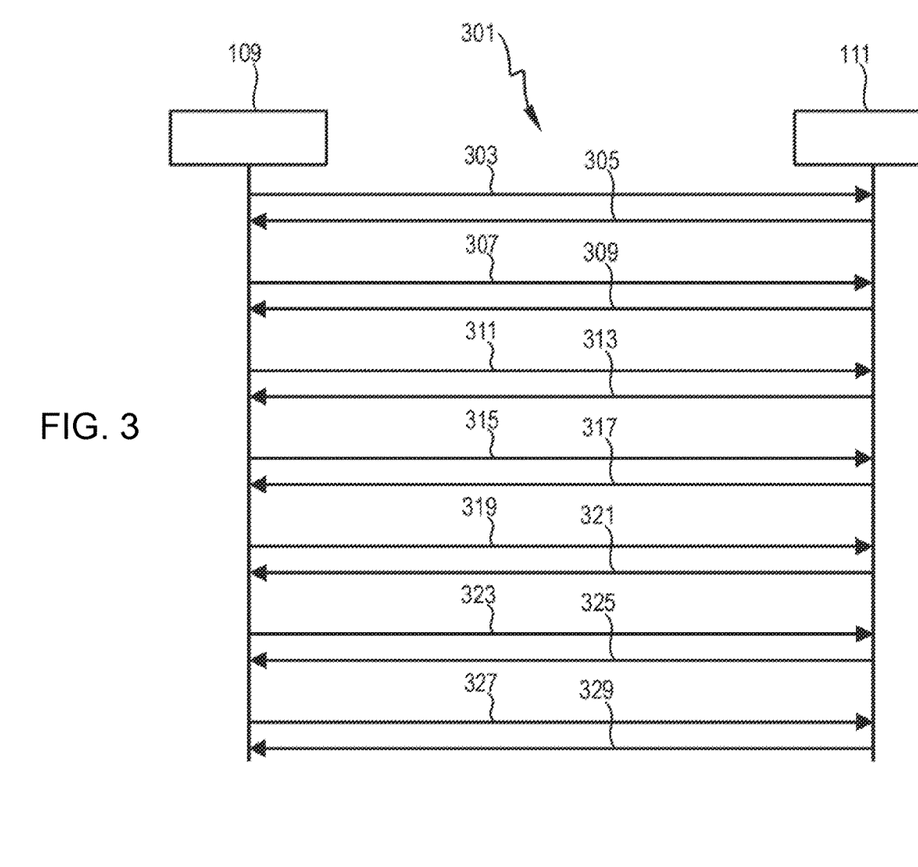
FIG. 3 is a schematic diagram of communication between components of a domestic appliance according to one embodiment.

FIG. 3 shows a schematic diagram of communication between components of a domestic appliance 100 according to one embodiment. In particular FIG. 3 shows an initialization sequence 301 consisting of parameter requests between the actuator controller 109 and the appliance controller 111.

According to one embodiment the appliance controller 111 can store parameters of the actuator controller 109, for example the door opening time or the status of the door lock. To this end the appliance controller 111 can have a memory, for example a flash memory. The parameters of the actuator controller 109 can be transmitted by way of the communication link from the actuator controller 109 to the appliance controller 111.

According to a further embodiment, after the domestic appliance 100 has been restarted or the actuator controller 109 has been reset, the actuator controller 109 can call up these parameters from the appliance controller 111 step by step in an initialization sequence 301. FIG. 3 shows an example of such an initialization sequence 301. The initialization sequence 301 consists of a sequence of requests from the actuator controller 109 to the appliance controller 111. The appliance controller 111 responds to the actuator controller 109 after each request. The initialization sequence 301 in FIG. 3 is as follows: in a first step a request is made for the type of domestic appliance 303, to which the appliance controller 111 responds with the serial number 305. In a second step a request is made for the status of the door lock 307, to which the appliance controller 111 responds with the status "open" or "locked" 309. In a third step a request is made for the status of the actuator controller 311, to which the appliance controller responds with the status "activated" or "deactivated" 313. In a fourth step a request is made for the operating mode of the actuator controller 315, to which the appliance controller responds with "push mode" or "pull mode" 317. In a fifth step a request is made for the door opening time 319, to which the appliance controller responds with an opening time in seconds 321, for example with 1, 2, 3, 4, 5, 6, 7, 8, 9 or 10 seconds. In a sixth step a request is made for the sensitivity level of the sensor in push mode 323, to which the appliance controller responds for example with "high", "medium" or "low" 325. In a seventh step a request is made for the sensitivity level of the sensor in pull mode 327, to which the appliance controller responds for example with "high", "medium" or "low" 329.

FIG. 4 shows a further schematic diagram of communication between components of a domestic appliance 100 according to one embodiment. In particular FIG. 4 shows communication between the actuator controller 109, the appliance controller 111 and the appliance function component 107 with an activity controller 401, for example a pushbutton or touch-sensitive display screen.

According to one embodiment a series of messages and/or parameter requests can be exchanged between the actuator controller 109 and the appliance controller 111 and/or the appliance function component 107 by way of the communication link. FIG. 4 shows examples of a parameter request and several messages. The parameter request is a self-test request 403 from the appliance controller 111 to the actuator controller 109, to which the actuator controller 109 responds with the status "ok" or an error message 405 after a self-test has been performed. If the self-test is performed in push mode, the actuator controller 109 can open the door 103 once as part of the self-test. The first message is the message about the door opening status 407 from the actuator controller 109 to the appliance controller 111, for example "door fully locked" or "door just opened". This status message ensures that the door lock only locks the door 103 when it is closed. The second message is a warning message about a locked door 409 from the actuator controller 109 to the appliance controller 111. This warning message can be issued for example if the actuator controller 109 receives an activation signal to activate the door actuator 105 while the door lock is active. An acoustic or optical warning signal can be output in response, it being possible for the acoustic warning signal to be a continuous or periodic tone and the optical warning signal to be an illuminated element in a signal color. The third message is an error message 411 from the actuator controller 109 to the appliance controller 111 as a result of an error in the actuator controller 109. The fourth message is an activation notification 413 from the appliance function component 107 and/or the activity controller 401 to the actuator controller 109. In response to this message activation of the door actuator 105 by the actuator controller 109 can be prevented. The fifth message is a deactivation notification 415 from the appliance function component 107 and/or the activity controller 401 to the actuator controller 109. In response to this message the door actuator 105 can be reactivated by the actuator controller 109. The deactivation notification 415 can take place for example 2 seconds after actuation of the activity controller 401.

According to a further embodiment the appliance controller 111 and the actuator controller 109 form a common control element, which is arranged on the appliance body 101 or on the door 103. The common control element is connected by way of communication lines to the appliance function component 107 and the door actuator 105. The parameters of the appliance controller 111 and the actuator controller 109 are stored in the common control element. This can significantly simplify a parameter request between actuator controller 109 and appliance controller 111, for example during the initialization sequence 301, as both controllers can use a common memory and processor and there is no need for an exchange of information by way of communication lines.

All the features described and illustrated in conjunction with individual embodiments of the invention can be provided in different combinations in the inventive subject matter in order to bring about their advantageous effect simultaneously.

The following is a summary list of reference numerals and the corresponding structure used in the above description of the invention:

100 Domestic appliance
101 Appliance body
103 Door
105 Door actuator
107 Appliance function component
109 Actuator controller
111 Appliance controller
113 Sensor
301 Initialization sequence
303 Request for type of domestic appliance
305 Response serial number
307 Request for status of door lock
309 Response "open" or "locked"
311 Request for status of actuator controller
313 Response "activated" or "deactivated"
315 Request for operating mode of actuator controller
317 Response "push mode" or "pull mode"
319 Request for door opening time
321 Response opening time in seconds
323 Request for sensitivity level of sensor in push mode
325 Response "high", "medium", or "low"

327 Request for sensitivity level of sensor in pull mode
329 Response "high", "medium", or "low"
401 Activity controller
403 Self-test request
405 Response "ok" or error message
407 Door opening status
409 Warning message about a locked door
411 Error message
413 Activation notification
415 Deactivation notification

The invention claimed is:

1. A domestic appliance, comprising:
an appliance body;
a door supported in a rotatable manner on said appliance body;
a door actuator for driving said door;
an activatable appliance function component disposed in said door;
an actuator controller for activating said door actuator, said actuator controller is configured to monitor an activity status of said activatable appliance function component and said actuator controller is configured only to activate said door actuator when said activatable appliance function component is inactive in response to receipt of an activation signal to activate said door actuator, said door being operable to be opened either manually at all times or by said door actuator when said activatable appliance function component is inactive;
said activatable appliance function component transmitting an activation notification to said actuator controller when said activatable appliance function component is activated; and
said actuator controller is configured to prevent activation of said door actuator when the activation notification from said activatable appliance function component is present and the activation signal to activate said door actuator is received.

2. The domestic appliance according to claim 1, wherein said activatable appliance function component and said actuator controller are linked to a communication line.

3. The domestic appliance according to claim 1, wherein said activatable appliance function component is selected from the group consisting of a dispenser component, a water dispenser component and a door lock.

4. The domestic appliance according to claim 1, wherein said activatable appliance function component has an activity controller.

5. The domestic appliance according to claim 1, further comprising a sensor for detecting actuation of said door by a user and is configured to transmit the activation signal to activate said door actuator to said actuator controller on detection of an actuation.

6. The domestic appliance according to claim 5, wherein a sensitivity of said sensor can be set.

7. The domestic appliance according to claim 1, further comprising an appliance controller for controlling said activatable appliance function component, said actuator controller and said appliance controller are connected for communication and said appliance controller is configured to transmit the activity status of said activatable appliance function component to said actuator controller.

8. The domestic appliance according to claim 7, wherein said actuator controller is configured to call up a number of current appliance parameters of the domestic appliance or said activatable appliance function component from said appliance controller.

9. The domestic appliance according to claim 1, wherein said actuator controller is configured to output a warning signal when the activation signal to activate said door actuator is received and said door is locked by means of a door lock.

10. The domestic appliance according to claim 1, wherein said actuator controller has an operating panel for parameterizing said door actuator.

11. The domestic appliance according to claim 1, wherein said door actuator can be deactivated manually by means of an operating panel.

12. The domestic appliance according to claim 1, wherein said appliance controller and said actuator controller form a common control element.

13. The domestic appliance according to claim 1, wherein said activatable appliance function component and said actuator controller are linked to a communication bus.

14. The domestic appliance according to claim 1, wherein said activatable appliance function component has a push-button or a touch-sensitive display screen, and is disposed on said door.

15. The domestic appliance according to claim 7, wherein said actuator controller is configured to call up a number of current appliance parameters of the domestic appliance or of said activatable appliance function component from said appliance controller, after the domestic appliance has been switched on electrically or after said door actuator has been reset, in an initialization sequence.

16. A method for controlling a door actuator for driving a door of a domestic appliance, the domestic appliance having an appliance body, on which the door is supported in a rotatable manner, an actuator controller for controlling the door actuator and an activatable appliance function component, which comprises the steps of:
monitoring an activity status of the activatable appliance function component disposed in the door;
transmitting, via the activatable appliance function component, an activation notification to the actuator controller when the activatable appliance function component is activated;
preventing, via the actuator controller, activation of the door actuator when the activation notification from the activatable appliance function component is present and an activation signal to activate the door actuator is received; and
activating the door actuator only when the activatable appliance function component is inactive, the door being operable to be opened either manually at all times or by the door actuator when the activatable appliance function component is inactive.

17. The method according to claim 16, which further comprises activating the door actuator when the door is actuated.

* * * * *